(12) United States Patent
Yun et al.

(10) Patent No.: US 11,776,557 B2
(45) Date of Patent: Oct. 3, 2023

(54) AUTOMATIC INTERPRETATION SERVER AND METHOD THEREOF

(71) Applicant: Electronics and Telecommunications Research Institute, Daejeon (KR)

(72) Inventors: Seung Yun, Daejeon (KR); Sang Hun Kim, Sejong-si (KR); Min Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 75 days.

(21) Appl. No.: 17/221,364

(22) Filed: Apr. 2, 2021

(65) Prior Publication Data

US 2021/0312938 A1    Oct. 7, 2021

(30) Foreign Application Priority Data

Apr. 3, 2020 (KR) .................. 10-2020-0041135
Mar. 26, 2021 (KR) .................. 10-2021-0039602

(51) Int. Cl.
| | |
|---|---|
| G10L 25/21 | (2013.01) |
| G10L 21/02 | (2013.01) |
| G06F 40/40 | (2020.01) |
| G10L 21/0308 | (2013.01) |
| G10L 15/20 | (2006.01) |
| G10L 15/22 | (2006.01) |
| G10L 15/30 | (2013.01) |
| G10L 21/0208 | (2013.01) |

(52) U.S. Cl.
CPC .......... *G10L 21/0308* (2013.01); *G10L 15/20* (2013.01); *G10L 15/22* (2013.01); *G10L 15/30* (2013.01); *G10L 25/21* (2013.01); *G10L 2015/227* (2013.01); *G10L 2021/02087* (2013.01)

(58) Field of Classification Search
CPC ....... G10L 21/02; G10L 19/26; G10L 15/005; G10L 25/21; G06F 40/40
See application file for complete search history.

(56) References Cited

U.S. PATENT DOCUMENTS

| | | |
|---|---|---|
| 10,216,729 B2 | 2/2019 | Kim et al. |
| 10,558,763 B2 | 2/2020 | Choi et al. |

(Continued)

FOREIGN PATENT DOCUMENTS

| | | | | |
|---|---|---|---|---|
| CN | 110166729 A | * | 8/2019 | ........... G06F 17/289 |
| EP | 2373016 | | 5/2011 | |

(Continued)

*Primary Examiner* — Shreyans A Patel
(74) *Attorney, Agent, or Firm* — KILE PARK REED & HOUTTEMAN PLLC

(57) ABSTRACT

Provided is a zero user interface (UI)-based automatic interpretation method including receiving a plurality of speech signals uttered by a plurality of users from a plurality of terminal devices, acquiring a plurality of speech energies from the plurality of received speech signals, determining main speech signal uttered in a current utterance turn among the plurality of speech signals by comparing the plurality of acquired speech energies, and transmitting an automatic interpretation result acquired by performing automatic interpretation on the determined main speech signal to the plurality of terminal devices.

16 Claims, 5 Drawing Sheets

(56) References Cited

U.S. PATENT DOCUMENTS

| | | | | |
|---|---|---|---|---|
| 11,277,685 B1* | 3/2022 | Ayrapetian | ............... | G10L 21/02 |
| 2014/0156254 A1* | 6/2014 | Frankel | ................ | G10L 15/005 |
| | | | | 704/2 |
| 2018/0033447 A1* | 2/2018 | Ramprashad | ........... | G10L 25/21 |
| 2018/0137876 A1 | 5/2018 | Sun et al. | | |
| 2020/0272699 A1* | 8/2020 | Sridhara | ................ | G06F 40/40 |

FOREIGN PATENT DOCUMENTS

| | | | | | |
|---|---|---|---|---|---|
| EP | 2373016 A2 | * | 10/2011 | ........... | G06F 17/289 |
| JP | 2005148301 A | * | 6/2005 | | |
| JP | 6670224 | | 3/2020 | | |
| KR | 20110061781 | | 6/2011 | | |
| KR | 20110061781 A | * | 6/2011 | ............. | G10L 19/26 |
| KR | 20130022549 | | 3/2013 | | |
| KR | 10-1747874 | | 6/2017 | | |
| KR | 20190029237 | | 3/2019 | | |
| KR | 20210097392 A | * | 8/2021 | ............. | G10L 15/26 |

\* cited by examiner

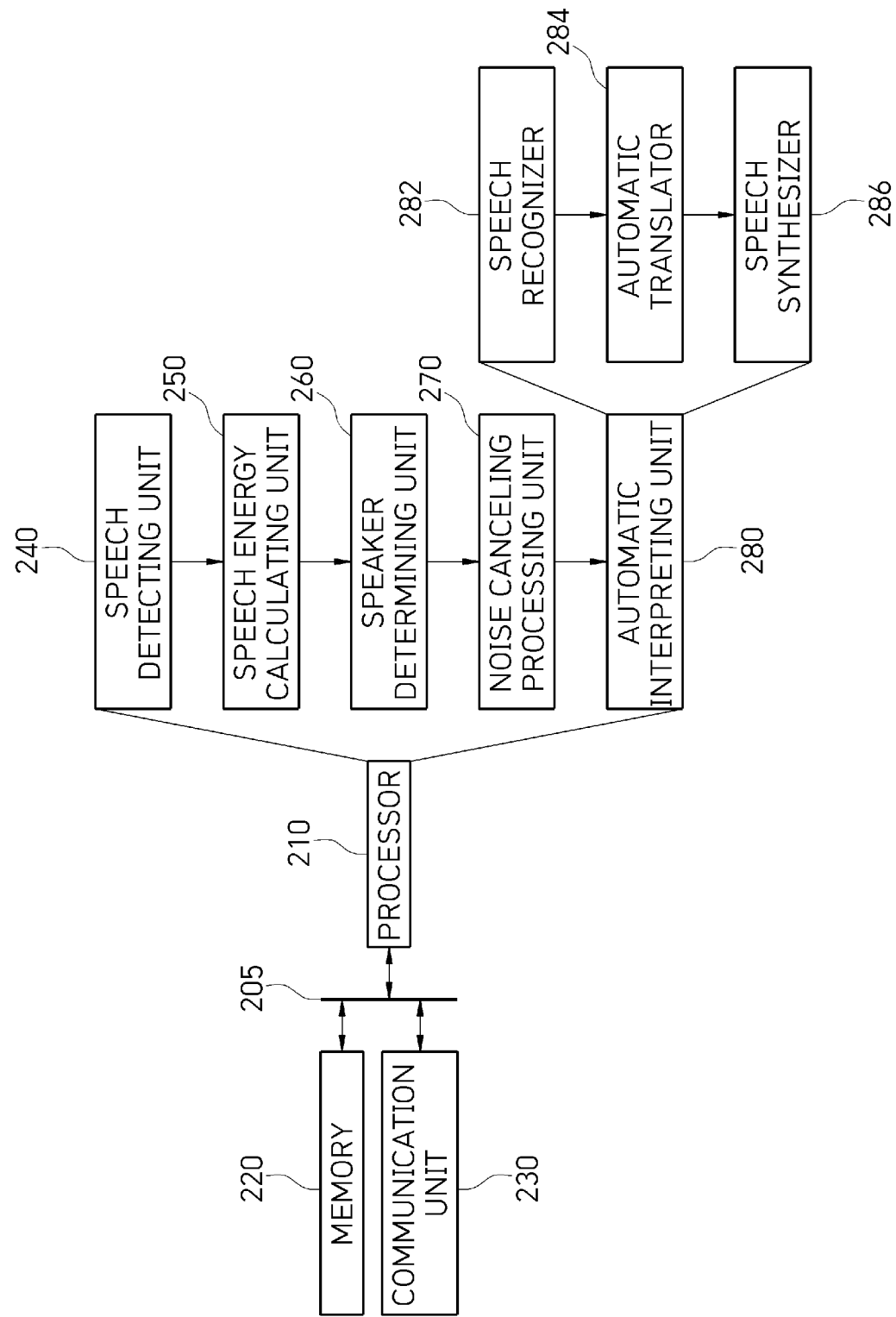

AUTOMATIC INTERPRETATION SERVER AND METHOD THEREOF

CROSS-REFERENCE TO RELATED APPLICATIONS

This application claims priority under 35 U.S.C. § 119 to Korean Patent Application No. 10-2020-0041135, filed on Apr. 3, 2020 and Korean Patent Application No. 10-2021-0039602, filed on Mar. 26, 2021, the disclosure of which is incorporated herein by reference in its entirety.

TECHNICAL FIELD

The present invention relates to an automatic interpretation server and method, and more particularly, to a technology related to a zero user interface (UI)-based automatic interpretation server and method not requiring a user interface (UI) such as a display screen.

BACKGROUND

With the development of speech recognition, automatic translation, and a speech synthesis technology, an automatic interpretation technology has widely been spread. The automatic interpretation technology is generally performed by smartphones or dedicated terminals for automatic interpretation.

A user touches a screen provided in a smartphone or a dedicated terminal or clicks a button, and then utters a sentence to be interpreted by placing the smartphone or the dedicated terminal close to a mouth.

Then, the smartphone or dedicated terminal generates a translation from the user's spoken sentence through speech recognition and automatic translation, and outputs the translation on a screen or outputs a translated speech corresponding to the translation through speech synthesis, thereby providing an interpretation result to a counterpart.

As such, a general automatic interpretation process performed by the smartphone or the dedicated terminal requires a touch operation or a click operation of the smartphone or dedicated terminal whenever a sentence to be interpreted is uttered.

In addition, a general automatic interpretation process performed by the smartphone or the dedicated terminal repeatedly requires an operation of bringing the smartphone or the dedicated terminal to the vicinity of a mouth whenever the user utters a sentence to be interpreted.

These operations are very uncomfortable operations for users, and are elements that interfere with natural conversation.

SUMMARY

Accordingly, the present invention provides an automatic interpretation system and method capable of performing a natural conversation with a counterpart, without an unnecessary operation performed whenever a user utters a sentence to be interpreted.

The present invention also provides an automatic interpretation system and method capable of solving a problem in which a user's automatic interpretation terminal device or counterpart user's automatic interpretation terminal device malfunctions in a situation in which the user's speech is input to the counterpart user's automatic interpretation terminal device or the counterpart's speech is input to the user's automatic interpretation terminal device.

In one general aspect, a zero user interface (UI)-based automatic interpretation method performed by a server communicating with a plurality of terminal devices having a microphone function, a speaker function, a communication function, and a wearable function includes: receiving a plurality of speech signals uttered by a plurality of users from a plurality of terminal devices; acquiring a plurality of speech energies from the plurality of received speech signals; determining main speech signal uttered in a current utterance turn among the plurality of speech signals by comparing the plurality of acquired speech energies; and transmitting an automatic interpretation result acquired by performing automatic interpretation on the determined main speech signal to the plurality of terminal devices.

In another general aspect, a zero user interface (UI)-based automatic interpretation server communicating with a plurality of terminal devices including a first terminal device of a first user and a second terminal device of a second user, the server being implemented as a computing device including at least one processor, a memory, and a system bus connecting the at least one processor and the memory, includes: a communication unit configured to receive a plurality of speech signals from a user terminal of each terminal device under the control of the at least one processor; a speech energy calculating unit configured to calculate a plurality of speech energies from the plurality of received speech signals under the control of the at least one processor; a speaker determining unit configured to determine a speech signal of a speaker among the plurality of speech signals by comparing the plurality of acquired speech energies under the control of the at least one processor; a noise canceling processing unit configured to cancel noise of the speech signal of the speaker under the control of the at least one processor; and an automatic interpreting unit configured to transmit an automatic interpretation result acquired by performing an automatic interpretation on the noise-free speech signal of the speaker to the plurality of terminal devices through the communication unit under the control of the at least one processor.

Since the automatic interpretation terminal device of the present invention is implemented in the form of a wearable device and does not require a user interface such as a screen or button for performing automatic interpretation, interpretation is processed automatically without an unnecessary operation of user's touching a screen of the terminal or clicking a button, thus making it possible for a user and a counterpart to naturally perform conversation.

In addition, in the course of a conversation between a first user and a second user, a user who actually speaks a speech requiring automatic interpretation is determined using an energy intensity of a speech signal uttered by each user, and a speech signal of the determined user is automatically interpreted, thereby preventing a malfunction that a terminal of the second user automatically interprets a speech of the first user.

Through this effect, the present invention enables a zero UI-based natural automatic interpretation conversation in a face-to-face situation.

Other features and aspects will be apparent from the following detailed description, the drawings, and the claims.

BRIEF DESCRIPTION OF THE DRAWINGS

FIG. 4 is an overall configuration diagram of an automatic interpretation server according to an embodiment of the present invention.

DETAILED DESCRIPTION OF EMBODIMENTS

Figure 1:
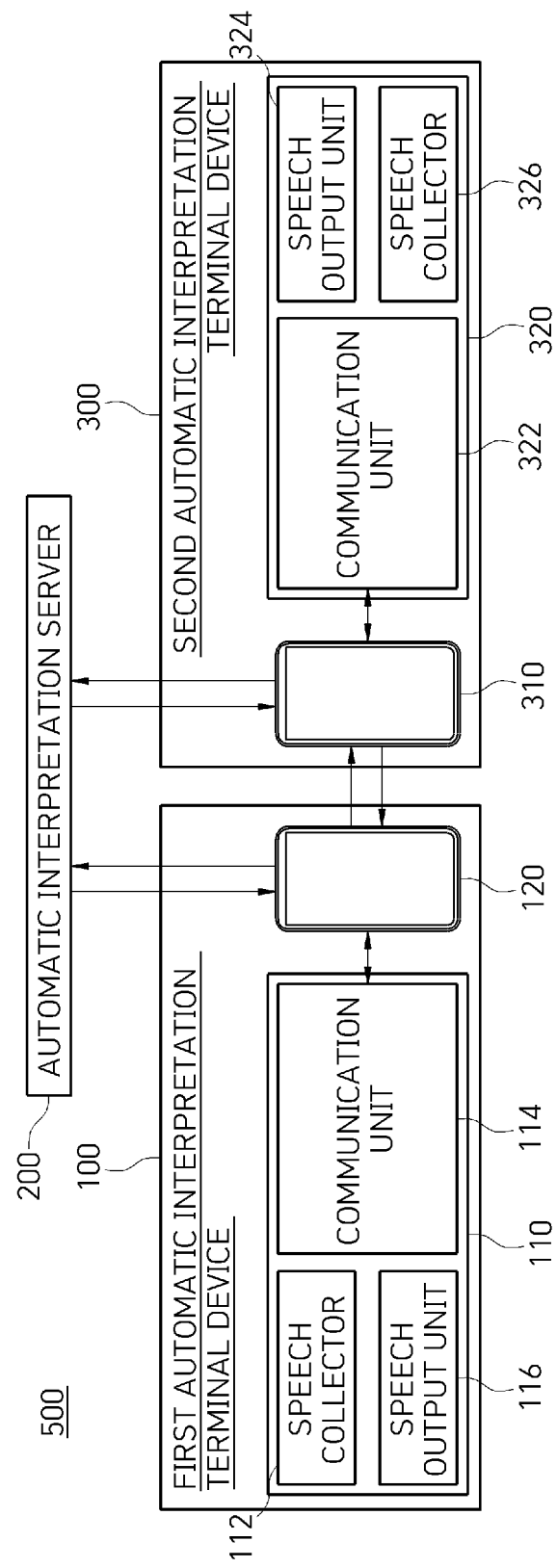
FIG. 1 is an overall configuration diagram of an automatic interpretation system according to an embodiment of the present invention.

Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout. It will be understood that although the terms including an ordinary number such as first or second are used herein to describe various elements, these elements should not be limited by these terms. These terms are only used to distinguish one element from another element.

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

The present invention provides an automatic interpretation terminal device implemented in the form of a wearable device and a method thereof, so that whenever a user utters a sentence to be interpreted, users may have natural conversations based on automatic interpretation, without an unnecessary operation of touching a screen of the terminal or clicking a button.

In addition, in the present invention, in the process of in which multiple users perform conversations based on automatic interpretation, a user who speaks a speech requiring automatic interpretation is determined by analyzing an energy intensity of a speech uttered by each user, and automatic interpretation is performed on the speech of the determined user.

By doing that, a malfunction in which the user's speech is input to another user's terminal and the other user's automatic interpretation terminal performs automatic interpretation on the user's speech, or, conversely, the user's terminal automatically interprets the other user's speech may be prevented.

FIG. 1 is an overall configuration diagram of an automatic interpretation system according to an embodiment of the present invention.

In FIG. 1, a situation in which two users have a conversation based on automatic interpretation is illustrated, but the present invention is not limited thereto. Accordingly, the present invention may be applied even in a situation in which three or more users have conversations based on automatic interpretation.

Referring to FIG. 1, an automatic interpretation system 500 according to an embodiment of the present invention includes a first automatic interpretation terminal device 100 of a first user, the automatic interpretation server 200, and a second automatic interpretation terminal device 300. In the claims appended to the present disclosure, an automatic interpretation terminal device may be indicated as a "terminal device", and an automatic interpretation server may be indicated as a "server".

The first and second users are users who have conversations based on automatic interpretation, and it is assumed that the first user is a user who may use a first language and the second user is a user who may use a second language different from the first language.

The first automatic interpretation terminal device 100 includes a first wearable device 110 and a first user terminal 120 connected by wired or wireless communication.

The first wearable device 110 includes a first speech collector 112, a first communication unit 114, and a first speech output unit 116.

The first speech collector 112 collects speeches of the first user who uses a first language, and may be, for example, a device having a high-performance small microphone function. The first speech collector 112 converts a speech of the first user into a speech signal and transmits the converted speech signal to the first communication unit 116.

The first communication unit 114 transmits the speech signal of the first user transmitted from the first speech collector 112 to the first user terminal 120 according to a wired or wireless communication method.

A type of wireless communication connecting the first communication unit 114 and the first user terminal 120 may be, for example, a short-range wireless communication such as Bluetooth communication or Bluetooth low energy communication (BLE).

In addition to a logic for communication, the first communication unit 114 may include at least one processor that controls and manages an overall operation of the wearable device 110.

The first user terminal 120 transmits the speech signal of the first user transmitted from the first communication unit 116 to the automatic interpretation server 200 according to a wireless communication method. The first user terminal 120 may be, for example, a portable terminal such as a smartphone, a personal digital assistant (PDA), and a handheld computer.

A type of wireless communication for connecting the first user terminal 120 and the automatic interpretation server 200 may be, for example, a third generation (3G) wireless communication, a fourth generation (4G) wireless communication, or a fifth generation (5G) may be wireless communication.

The automatic interpretation server 200 performs an automatic interpretation process on the speech signal of the first user transmitted from the first user terminal 120. Here, the automatic interpretation process includes a speech detection process, a speech recognition process, an automatic translation process, and a speech synthesis process.

A speech activity detection process is a process of detecting a speech section in which an actual speech exists in the speech signal of the first user, which detects a start point and an end point of the actual speech.

A speech recognition process is a process of analyzing a speech signal of the first user using the first language and converting the analyzed speech signal into text data in the first language.

The automatic translation process is a process of analyzing text data in the first language and converts the analyzed text data into text data in a second language used by a second user (hereinafter referred to as "automatically translated text").

The speech synthesis process is a process of converting text data in the second language into speech (automatically interpreted speech signal or synthesized speech).

The speech detection process, the speech recognition process, the automatic translation process, and the speech synthesis process are not shown, but may be implemented by a speech detector, a speech recognizer, an automatic translator, and a speech synthesizer mounted in the automatic interpretation server 200.

Each of the speech detector, speech recognizer, automatic translator, and speech synthesizer may be implemented as a software module, a hardware module, or a combination thereof executed or controlled by at least one processor.

When the speech detector, the speech recognizer, the automatic translator, and the speech synthesizer are implemented as a software module, the software module may be referred to as an artificial neural network model learned by a machine learning method.

Meanwhile, the speech recognizer may be a speech recognizer having an end-to-end structure enabling language identification.

A general speech recognizer includes components such as a language model, an acoustic model, and a pronunciation dictionary classified according to functions, but the end-to-end speech recognizer capable of performing language identification is a recognizer having all functions necessary for speech recognition by a single neural network.

That is, the end-to-end speech recognizer capable of performing language identification is a neural network trained to enable speech recognition using training data in which different languages A and B are mixed.

Such an end-to-end speech recognizer capable of performing language identification may output text in a language A when a speech signal in the language A is input, and output text in a language B when a speech signal in the language B is input.

Even if the speech recognizer does not have the end-to-end structure, there is no significant problem in the execution of the automatic interpretation method according to the present invention and the operation of the automatic interpretation system. However, since the end-to-end speech recognizer effectively provides a language identification function, the end-to-end speech recognizer may be preferably used.

In addition, the speech detector, the speech recognizer, the automatic translator, and the speech synthesizer may be implemented as an integrated module, and in this case, the integrated module may be referred to as a end-to-end automatic interpreting unit.

Since the present invention does not have a feature in specific algorithms related to speech detection, speech recognition, automatic translation, and speech synthesis, descriptions of these processing procedures are replaced by known techniques.

However, the speech detection process may be performed by the first user terminal 120, and here, the speech detection process may be omitted in the automatic interpretation process performed by the automatic interpretation server 200.

The automatic interpretation server 200 transmits an automatic interpretation result generated according to the automatic interpretation process performed on the speech signal of the first user to the second automatic interpretation terminal device 300.

The automatic interpretation result includes a speech recognition result generated by the speech recognition process, an automatically translated translation generated by the automatic translation process, and an automatically interpreted speech signal generated by the speech synthesis process. Here, the speech recognition result is text data in the first language used by the first user, the automatically translated translation is text data in the second language used by the second user, and the automatically interpreted speech signal is a speech signal in the second language used by the second user.

The automatic interpretation server 200 transmits the automatically translated translation and/or the automatically interpreted speech signal to the second automatic interpretation terminal device 300. Additionally, the automatic interpretation server 200 may transmit the speech recognition result to the first user terminal 120.

In order to perform an automatic interpretation process and transmit the automatic interpretation result generated according to the automatic interpretation process to the second automatic interpretation terminal device 300, the automatic interpretation server 200 may be implemented as a computing device including at least one processor, a memory, and a communication unit.

At least one processor may perform an operation related to speech detection, speech recognition, automatic translation, and speech synthesis, or execute an algorithm related thereto.

The memory is a component for temporarily or permanently storing an intermediate result and a final result processed by at least one processor, and includes a volatile memory and a non-volatile memory.

The communication unit supports wireless communication to exchange information between the user terminals 120 and 310 and the automatic interpretation server 200. Here, the wireless communication may be at least one of 3G communication, 4G communication, and 5G communication.

The second automatic interpretation terminal device 300 includes a second user terminal 310 and a second wearable device 320 connected by wired or wireless communication.

The second user terminal 310 receives the automatically translated translation and/or the automatically interpreted speech signal from the automatic interpretation server 200, and transmits the automatically interpreted speech signal to the second wearable device 320. The second user terminal 310 may be, for example, a portable terminal such as a smartphone, a personal digital assistant (PDA), a hand-held computer, or the like.

Meanwhile, a communication connection is established between the first user terminal and the second user terminal participating in the conversation based on automatic interpretation.

In order to establish a communication connection, the second user terminal 310 may be connected (paired) with the first user terminal 120 according to, for example, wireless communication, or the first and second users may be connected through the server.

When the first and second user terminals are connected through the server, a communication connection may be established such that one user terminal receives user information and terminal information for a counterpart user terminal, and, conversely, the counterpart user terminal receives user information and terminal information for the one user terminal and attempts connection.

Communication connection (pairing) between the first and second user terminals 120 and 310 may start according to execution of an automatic interpretation application installed in each terminal or an operation of touching a specific portion of the wearable device interworking with each user terminal.

As another example, the communication connection (pairing) between the first and second user terminals 120 and 310 may start by uttering a wake-up word using a speech collector in a wearable device interworking with the user terminal.

The communication connection (pairing) between the first and second user terminals 120 and 310 is based on, for example, a BLE communication protocol. In the case of communication connection according to the BLE communication protocol, one of the first and second user terminals 120 and 310 serves as an advertiser and the other user terminal serves as an observer.

When the first user terminal 120 serves as an advertiser and the second user terminal 310 serves as an observer, the first user terminal 120 may broadcast an advertising signal at a predetermined period, and when the second user terminal 310 successfully scans the advertising signal, the first user terminal 120 and the second terminal 310 are paired.

When the first user terminal 120 and the second user terminal 310 are paired to complete the communication connection, the first user terminal 120 and the second user terminal 310 may perform one-to-one communication.

Meanwhile, in this communication connection process, the first and second user terminals 120 and 310 may exchange language information and user information necessary for automatic interpretation.

The language information may be information for a user of one interpretation terminal device to identify a language used by a user of a counterpart interpretation terminal device. Here, the language information may be, for example, information indicating a type of language used by the counterpart user.

Such information may be exchanged after the first user terminal 120 and the second user terminal 310 are paired.

According to the exchange of language information, when it is impossible to automatically interpret a language used by the counterpart user, both user terminals output a connection failure message through a display screen.

When it is possible to automatically interpret the language used by the counterpart user, the user terminals 120 and 310 and the automatic interpretation server 200 may all be connected, so that all participants may participate in the conversation.

The second wearable device 320 includes a second communication unit 322, a second speech output unit 322, and a second speech collector 324.

The second communication unit 322 receives an automatically interpreted speech signal from the second user terminal 310 according to a wired or wireless communication method and transmits the received speech signal to the second speech output unit 324.

A type of wireless communication connecting the second communication unit 322 and the second user terminal 310 may be, for example, a short-range wireless communication such as Bluetooth communication or Bluetooth low energy (BLE).

The second speech output unit 324 outputs the automatically interpreted speech signal transmitted from the second user terminal 310. The second speech output unit 324 may be a device having a high-performance speaker function implemented in the form of an earphone that may be worn on the ear of the second user or a headset that may be worn on the head.

By wearing the second speech output unit 324 implemented as an earphone or a headset, a speech signal obtained by automatically interpreting a speech spoken by the first user may conveniently be listened.

Meanwhile, the second speech collector 324 is configured to collect speeches uttered by the second user in the second language and may be a device equipped with a high-performance microphone function.

The second speech collector 324 converts a speech of the second user into a speech signal and transmits the speech signal to the second communication unit 322, and the second communication unit 322 transmits the speech signal of the second user to the second user terminal 310.

The second user terminal 310 transmits the speech signal of the second user to the automatic interpretation server 200, and the automatic interpretation server 200 performs an automatic interpretation process on the speech signal of the second user to generate an automatically translated translation and/or automatically interpreted speech signal, and transmits the same to the first user terminal 120 of the first automatic interpretation terminal device 100.

The first user terminal 120 displays the automatically translated translation transmitted from the automatic interpretation server 200, and simultaneously transmits the automatically interpreted speech signal to the first speech output unit 116 through the first communication unit 114.

The first speech output unit 116 may be implemented in the same earphone or headset form as the second speech output unit 324, and outputs the automatically interpreted speech signal in the same manner. In this way, the first user may also conveniently hear the speech signal of the first language interpreted from the speech spoken by the second user in the second language.

Meanwhile, in a situation in which the first user and the second user share an automatic interpretation-based conversation at a close distance, the speech of the first user may be collected by the second speech collector of the second automatic interpretation terminal device 300 of the second user, or conversely, the speech of the second user may be collected by the first speech collector 112 of the first automatic interpretation terminal device 100 of the first user.

Here, there may be a problem in that the automatic interpretation server 300 performs an automatic interpretation process on the speech signal of the second user received through the first automatic interpretation terminal device 100 or performs an automatic interpretation process on the speech signal of the first user received through the second automatic interpretation terminal device 200.

In addition, when the automatic interpretation server 300 receives the speech signal of the first user and the speech signal of the second user respectively from the first and second automatic interpretation terminal devices 100 and 200 in the same time zone, there may be a problem in that the automatic interpretation server 300 may perform automatic interpretation on the speech signal of the second user even if the automatic interpretation server 300 should perform the automatic interpretation process on the speech signal of the first user in a current uttering turn, or conversely may perform the automatic interpretation process on the speech signal of the first user even if the automatic interpretation server 300 should perform the automatic interpretation process on the speech signal of the second user.

In order to solve this problem, when the automatic interpretation server 300 receives the speech signal of the first user and the speech signal of the second user respectively from the first and second automatic interpretation terminal devices 100 and 200 in the same time zone, the automatic interpretation server 300 may determine a user who has actually uttered a speech in the current utterance turn, that is, a speech signal corresponding to a preferential processing target, and preferentially performs an automatic interpretation process on the determined speech signal.

In order to determine a speech signal corresponding to the preferential processing target, an energy intensity of the speech signal of the first user and an energy intensity for the speech signal of the second user may be compared and a speech signal having higher energy intensity may be determined as a main speech signal corresponding to the preferential processing target.

The automatic interpretation server 300 may perform an automatic interpretation process on the determined main speech signal, may perform the automatic interpretation process on other speech signals, or may perform the automatic interpretation process after performing the automatic interpretation process on the main speech signal.

Hereinafter, an automatic interpretation method based on the automatic interpretation system shown in FIG. 1 will be described in more detail.

Figure 2A:
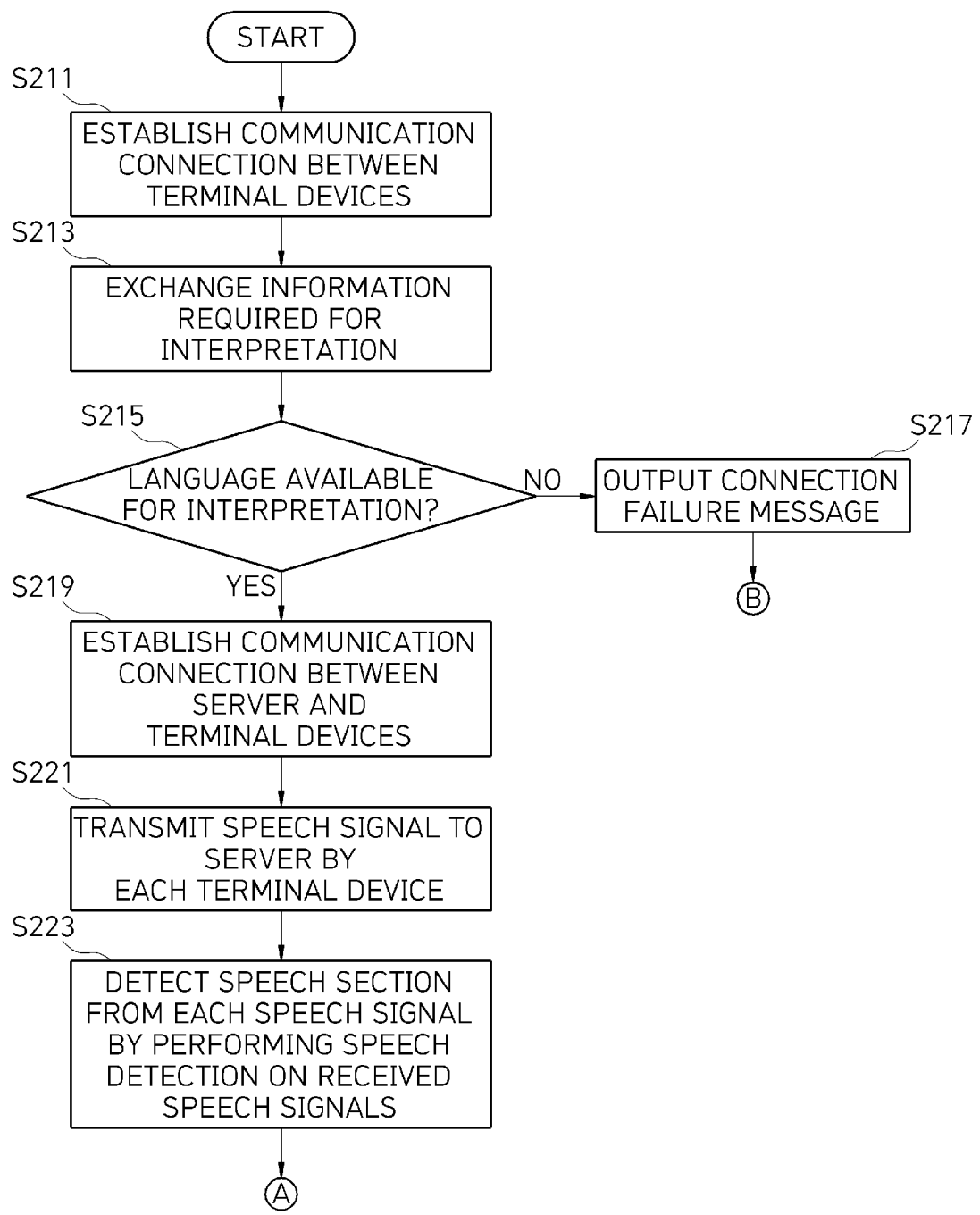
FIGS. 2A and 2B are flowcharts illustrating an automatic interpretation method according to an embodiment of the present invention.
Figure 2B:
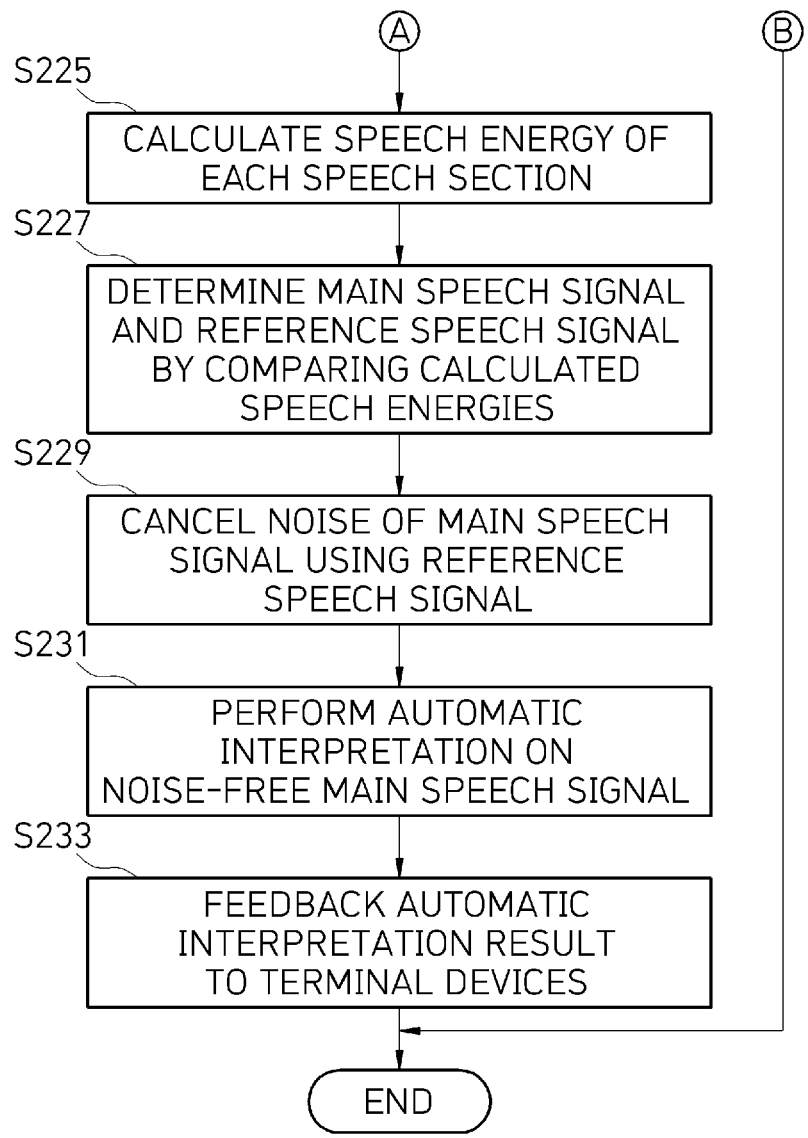

FIGS. 2A and 2B are flowcharts illustrating an automatic interpretation method according to an embodiment of the present invention.

First, it is assumed that a plurality of users having a zero UI-based automatic interpretation terminal device (including a user terminal and a wearable device) shown in FIG. 1 have a conversation. In addition, it is assumed that a plurality of users speak different languages.

A zero UI refers to that the automatic interpretation terminal device according to the present invention does not have a user interface that requires an operation interfering with a natural conversation.

First, referring to FIG. 2A, in step S211, a process of establishing a communication connection between automatic interpretation terminal devices of a plurality of users is performed. Here, the communication connection between the automatic interpretation terminal devices refers to a communication connection between a user terminal included in the automatic interpretation terminal device of one user and a user terminal included in the automatic interpretation terminal device of the other user.

When there are three or more users, a user terminal included in an automatic interpretation terminal device of a third party participates in a communication connection.

Communication connection may be performed according to a communication protocol such as BLE. Alternatively, the communication connection may be performed using user information previously registered in the automatic interpretation server 200.

The communication connection may be automatically performed when a distance to the counterpart user is close, depending on an implementation method of equipment. In addition, the communication connection may be performed through a method of executing an automatic interpretation application installed in a user terminal (smartphone), a method of touching an earphone, or a method of uttering a wake-up word.

Subsequently, in step S213, when the communication connection is completed, the user terminals 120 and 310 exchange information necessary for automatic interpretation. Here, the information necessary for automatic interpretation includes, for example, language information identifying a type of language, user information, and standards.

Subsequently, in step S215, the user terminal 120 of one user checks language information received from the counterpart user terminal 310, and it is determined whether a first language used by the one user can be automatically interpreted to a second language used by the counterpart user.

When it is not possible to automatically interpret the first language into the second language, both user terminals 120 and 310 output a connection failure message in step S217. Here, the automatic interpretation process is terminated as it is. In order to notify the automatic interpretation server 200 of the connection failure, both user terminals 120 and 310 or one user terminal may transmit a connection failure message to the automatic interpretation server 200.

Conversely, if automatic interpretation is possible, the automatic interpretation terminal devices 100 and 300 transmit a connection success message to the automatic interpretation server 200 and a communication connection is established between the automatic interpretation server 200 and the automatic interpretation terminal devices 100 and 300 in step S219. By doing that, all users participating in the conversation with the automatic interpretation server 200 are connected.

Next, in step S221, the user terminal included in each automatic interpretation terminal device continuously transmits the speech signal of the user collected through the speech collector to the automatic interpretation server 200. Here, each user terminal also transmits time information to the automatic interpretation server 200 as necessary. The time information is used by the automatic interpretation server 200 to synchronize speech signals received from the user terminals 100 and 300.

Next, in step S223, the automatic interpretation server 200 detects a speech section in which an actual speech exists in each speech signal by performing speech detection on the synchronized speech signals. The speech section is defined by a start point and an end point. Accordingly, the speech detection may specifically include a process of detecting the start point of the speech section and the process of detecting the end point of the speech section.

In the present disclosure, when the start point detection process and the end point detection process are classified, the start point detection process is referred to as "speech activity detection (VAD)" for convenience, and the end point detection process is referred to as "end point detection (EPD)" for convenience.

When the detection of the speech section from the speech signal fails, the attempt of automatic interpretation is terminated. If sporadic noise other than human speech is input to the speech collectors 112 and 326, since the speech section is not detected, the attempt of automatic interpretation is also terminated here.

Next, referring to FIG. 2B, in step S225, when a speech section of each speech signal is detected, the automatic interpretation server 200 calculates speech energy for each speech section. Here, the speech energy may be, for example, power spectrum density in a frequency domain.

Subsequently, in step S227, the automatic interpretation server 200 determines a main speech signal and a reference speech signal by comparing magnitudes of the calculated speech energies.

A method of determining a main speech signal includes, for example, comparing the magnitudes of the calculated speech energies, selecting a speech section having the largest speech energy, and determining a speech signal corresponding to the selected speech section as a main speech signal.

Specifically, in step S225, a first power spectral density is calculated in the first speech section detected from the first speech signal, and a second power spectral density is calculated in a second speech section detected from the second speech signal.

Subsequently, in step S227, based on the calculated first and second power spectral densities, the magnitudes of the calculated speech energies are compared by calculating a difference (power level difference) between a power level in the first speech section and a power level in the second speech section based on the calculated first and second power spectral densities. That is, a speech signal having the highest power level may be determined as the main speech signal.

The comparison process is performed in units of defined frames within a synchronized speech section, and is performed up to an end point of the speech section. The main speech signal may be determined by comparing the average value of the power spectral densities calculated in each speech section.

Alternatively, when the difference in energy intensity reaches an accumulated average threshold value, while moving in a frame unit within each speech section, a main speech signal may be determined based thereon.

When the main speech signal is determined, a reference speech signal used for noise canceling is determined.

As an example, when the automatic interpretation server 200 receives the speech signal of the first user from the first user terminal 120 and receives the speech signal of the second user from the second user terminal 310, if the speech signal of the first user is determined as the main speech signal, the second speech signal may be determined as the reference speech signal.

As another example, in a case in which a plurality of users (e.g., three or more users) participate in a conversation, the automatic interpretation server 200 may compare three or more speech signals received from three or more user terminals and determine a speech signal having the smallest speech energy as a reference speech signal.

When three or more users participate in a conversation in a space where specific noise exists, the automatic interpretation server 200 may determine a speech signal having a median speech energy among the received speech signals, as a reference speech signal.

Here, the median size may be an average size of speech energies calculated from all speech signals. That is, after calculating an average magnitude of speech energies calculated from all speech signals, a speech signal having a speech energy having a magnitude closest to the average magnitude is a reference speech signal.

Subsequently, in step S229, when the main speech signal and the reference speech signal are determined in the previous step, the automatic interpretation server 200 cancels noise of the main speech signal using the reference speech signal.

When the main speech signal and the reference speech signal are determined, it is determined whether the main speech signal contains noise. Whether the main speech signal includes noise may be easily determined by analyzing characteristics of the main speech signal.

If the main speech signal does not contain noise, the process proceeds to step S233, and if the main speech signal contains noise, noise cancellation is performed through signal processing of two or more channels.

This noise cancellation may be performed immediately after speech detection (VAD and EPD). Here, step S225 may be a process of calculating speech energies from speech sections from which noise was canceled, and step S227 is a process of comparing the magnitudes of speech energies calculated from speech sections from which noise was canceled to determine a main speech signal.

The noise canceling process will be described in detail below with reference to FIG. 3.

Subsequently, in step S231, the automatic interpretation server 200 performs automatic interpretation on the main speech signal from which noise was canceled. The automatic interpretation process includes, for example, a speech recognition process, an automatic translation process, and a speech synthesis process.

In the speech recognition process, a process of generating first text data (or speech recognition result) including the first language from the main speech signal including the first language is performed.

In the automatic translation process, a process of generating second text data (automatic translation result or automatically translated translation) including the second language automatically translated from the first text data including the first language is performed.

In the speech synthesis process, a process of generating a speech signal (synthetic speech or an automatically interpreted speech signal) including the second language synthesized from the second text data including the second language is performed.

The first text data, second text data (automatically translated translation), and the speech signal including the second language generated by each process is configured as an automatic interpretation result.

The speech recognition process may be performed by an end-to-end speech recognizer capable of performing language identification, as described above.

While the first user who uses the language A speaks, a speech signal of the second user who uses the language B may be input to the speech collector 112 of the first user and the speech signal of the second user input to the speech collector 112 of the first user is determined as a main speech signal, a malfunction may occur as speech recognition is performed on the speech signal of the first user who uses the language A, rather than being performed on the speech signal of the first user who uses the language A.

This problem may be solved using an end-to-end speech recognizer trained to enable language identification. That is, since the speech recognizer capable of performing language identification may recognize that the speech signal input through the first user terminal is language A, if it recognizes that the speech signal input through the first user terminal is language B, speech recognition is no longer performed and may be stopped.

In addition, since the end-to-end speech recognizer of the automatic interpretation server 200 is capable of identifying a language, even though the speech signal of the second user is input from the speech collector 112 of the automatic interpretation terminal device 100 of the first user, the end-to-end speech recognizer may perform speech recognition as it is and provide an automatic interpretation result based on the corresponding speech recognition result to the automatic interpretation terminal device 100 of the first user, rather than to the automatic interpretation terminal device 300 of the second user.

In this way, the automatic interpretation process of the present invention may operate robustly against a malfunction of the automatic interpretation using the end-to-end speech recognizer capable of performing language identification.

Thereafter, when the automatic interpretation is completed in the previous step S231, the automatic interpretation server 200 feeds back the automatic interpretation result to the automatic interpretation terminal devices (e.g., 100 and 300) in step S233. Here, as described above, the automatic interpretation result includes the first text data of the first language converted from the main speech signal of the first language, the second text data of the second language translated from the first text data of the first language, and a synthesized speech of the second language synthesized from the second text data.

The automatic interpretation server 200 transmits the first text data of the first language to the automatic interpretation terminal device of the speaker so that the speaker may determine whether the speech recognition result for the speech uttered by the speaker is correct.

Additionally, the automatic interpretation server 200 may perform speech synthesis on the first text data of the first language corresponding to the speech recognition result, and transmit the synthesized speech of the first text data of the first language to the automatic interpretation terminal device.

Also, the automatic interpretation server 200 transmits the second text data (translation0 of the second language and the synthesized speech of the second language synthesized from the second text data to the automatic interpretation terminal device of the counterpart user selectively or simultaneously.

Meanwhile, FIGS. 2A and 2B illustrate an embodiment in which the speech detection process is performed in the automatic interpretation server 200, but the speech detection process may also be performed in the user terminal of the user's automatic interpretation terminal device.

When the user terminal performs a speech detection process, the user terminal performs a speech detection process of recording the user's speech and then detecting a speech section from the recorded speech.

When the detection of the speech section in any one user terminal is completed, time information on the detected speech section is transmitted to the counterpart user terminals and the automatic interpretation server.

By doing that, the user terminals of all the remaining users who participate in the conversation detect the speech section synchronized with the time information provided from the any one user terminal from their respective speech signals, and transmit the detected speech section to the automatic interpretation server 200.

Subsequent processes, for example, calculating speech energy of each speech section, determining a main speech signal and a reference speech signal, canceling noise, and performing automatic interpretation are the same as those described in FIGS. 2A and 2B.

Meanwhile, if the user terminal fails to detect the speech section from each speech signal, automatic interpretation is terminated, and here, the user terminals failing to detect the speech do not transmit the collected speech signals to the automatic interpretation server.

For reference, the automatic interpretation server 200 detects the speech section for the speech signal of another user in the user terminal of the other user, while performing the automatic interpretation process on the speech signal of the first user, and when a speech signal corresponding to the detected speech section is received, the automatic interpretation server 200 attempts automatic interpretation process on the speech signal of the other user.

This means that an automatic interpretation is naturally performed on a speech signal of a third user who suddenly participates in the conversation in the process of the first and second users having a conversation with each other.

When the third user suddenly participates in the conversation, while the first and second users have a conversation, the first and second users may stop the conversation, but the speeches of the first and second users and a speech of the third user may overlap in a very small speech section of the entire speech section.

Even if there is a speech section in which the speeches of the first and second users and the speech of the third user overlap, the overlapping speech section corresponds to a very partial section in the entire speech section, and thus, a probability of an occurrence of an error in the process of comparing speech energies of the first to third users in the entire speech section may be extremely small.

Furthermore, if a difference in speech energies due to the physical distances between the users is further considered, the situation in which the third party intervenes in the conversation between the first and second users is not an obstacle to the determination of the main speech signal.

Meanwhile, in FIGS. 2A and 2B, steps performed sequentially are exemplarily shown to help understanding of the invention and may be variously changed. For example, some steps may be performed in parallel or may be reversed.

Also, specific steps may be combined into one step. For example, steps S211 to S219 may be integrated into one step, and steps S223 to S229 may also be integrated into one step.

Figure 3:
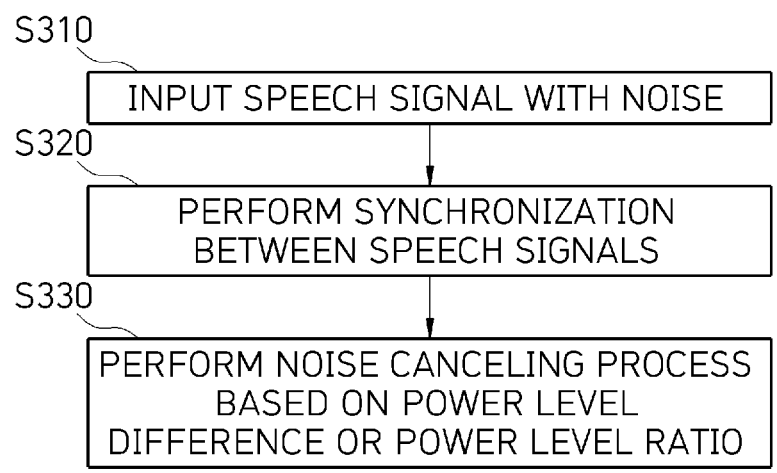
FIG. 3 is a flowchart illustrating a noise canceling process (S229 of FIG. 2B) according to an embodiment of the present invention.

FIG. 3 is a flowchart illustrating a noise canceling process (S229 of FIG. 2B) according to an embodiment of the present invention.

Referring to FIG. 3, the noise canceling process is not illustrated, but may be a software module or a hardware module that may be referred to as a noise canceling processing module. These may be executed or controlled by at least one processor provided in the automatic interpretation server 200.

First, in step S310, a main speech signal including noise is input.

Subsequently, in step S320, a synchronization process is performed between speech signals to compensate for a speech delay between the main speech signal and the reference speech signal that occurs due to differences in the physical distance between users and a rate of communication networks, etc.

Subsequently, in step S330, a process of canceling noise using a power level difference or a power level difference ratio is performed according to noise characteristics.

For example, a power level of a speech signal M corresponding to a speech section in the main speech signal and a power level of the noise signal M corresponding to a noise section are estimated, and in the same manner, a power level of a speech signal R corresponding to a speech section in the reference speech signal and a power level of a noise signal R corresponding to a noise section are estimated.

Thereafter, noise of the main speech signal is canceled using a ratio of a difference in power level between the estimated speech signal M and the speech signal R and a difference in power level between the estimated noise signal M and the noise signal R.

Meanwhile, when users have a conversation in a quiet space such as an enclosed space, that is, when users have a conversation in a noise-free environment, the noise canceling process (S229 in FIG. 2B and FIG. 3) may act as a factor that rather increases a processing time of the automatic interpretation process.

When users have a conversation in a noise-free environment, it would be desirable to stop the processing for noise canceling (S229 in FIG. 2B and FIG. 3) in the automatic interpretation server 200.

Accordingly, when the conversation place is a noise-free environment, the user may stop the operation of the noise canceling processing module included in the automatic interpretation server 200 by transmitting a noise canceling stop command to the automatic interpretation server 200 using an automatic interpretation application installed in the user terminal.

Meanwhile, when the conversation place is an environment with noise, the user may control initiation of an operation of the noise canceling processing module included in the automatic interpretation server 200 by transmitting a noise canceling operation command to the automatic interpretation server 200 using the automatic interpretation application installed in the user terminal.

The automatic interpretation system and method described above with reference to FIGS. 1 to 3 performs automatic interpretation for speeches of a third party who does not belong to a conversation group. In a situation where users belonging to a conversation group have a conversation, it is very natural that the users hear a speech of the third party that they do not know at all.

Accordingly, the automatic interpretation system and method described in FIGS. 1 to 3 automatically interpret even the speech of the third party who does not belong to the conversation group and provide an automatic interpretation result to users in the conversation group in order to produce a natural situation such as in real life.

Specifically, in the automatic interpretation system and method according to the present invention, as described in FIGS. 2A and 2B, a speech of the third party is acquired and a speech section is detected from a speech signal of the third party.

Here, the third party may be a user who does not have the automatic interpretation terminal device of the present invention, and in this case, a target for collecting the speech of the third party may be a wearable device (speech collector or microphone) worn by users located at a close distance to the third party. This means that a location of a main microphone that collects the main speech signal may vary depending on a location of the third party.

The main speech collector is determined by comparing energy levels of speech signals collected by each speech collector (e.g., a microphone), and a speech signal collected by the determined main speech collector may be determined as a main speech signal. In most cases, a speech collector of a user located at the closest distance to the third party is likely to be determined as the main speech collector.

In a noisy environment, the noise processing module of the automatic interpretation server 200 cancels noise as described with reference to FIG. 3, but in a noise-free environment, the noise canceling process may not be performed by a user selection.

The main speech signal from which noise was removed is input to the end-to-end speech recognizer, the end-to-end speech recognizer outputs a speech recognition result, the speech recognition result is input to an automatic translator, and the automatic translator outputs an automatic translation result. The automatic translation result is input to the speech synthesizer, and the speech synthesizer outputs an interpreted synthesized speech.

When some of the users belonging to the conversation group with language of the third party use the same language as the language of the third party, the some users may recognize the speech of the third party, so the automatic interpretation server 200 may not transmit the result of speech recognition of the third party to the user terminals of some of the users.

However, according to the system policy, the automatic interpretation server 200 may transmit the speech recognition result of the third party to the user terminals of some users, and here, the speech recognition result in the form of a synthesized speech rather than a text form may be transmitted to the user terminals of some users.

The automatic interpretation server 200 transmits automatically translated translation and/or automatically interpreted synthesizes speech in the language of the other remaining users to the remaining users who use a language different from the language of the third party among the users who belong to the conversation group.

The automatic interpretation system and method described above with reference to FIGS. 1 to 3 may be usefully utilized in the creation of automatic speech recognition minutes for each speaker in a multi-party conference system.

In this case, after all the users who participated in the conference are connected to a minutes creation server, the steps performed in FIGS. 2A and 2B are performed, the speech recognition result or the automatic translation result is not fed back to the users in the last stage but stored for each time zone and each speaker.

FIG. 4 is an overall configuration diagram of an automatic interpretation server according to an embodiment of the present invention.

Referring to FIG. 4, the automatic interpretation server 200 according to an embodiment of the present invention communicates with a plurality of terminal devices including the first automatic interpretation terminal device 100 of the first user and the second automatic interpretation terminal device 300 of the second user.

Here, each of the first and second terminal devices includes the wearable devices 110 and 320 having a microphone function for collecting a user's speech signal and a speaker function for outputting a synthesized speech including a language of the second user different from a language of the first user and user terminals 120 and 310 communicating with the wearable devices.

The automatic interpretation server 200 may be a computing device including at least one processor 210, a memory 220, a communication unit 230, and a system bus 205 connecting them. Here, the communication unit 230 receives a plurality of speech signals from the user terminals 120 and 310 of each terminal device under the control of the at least one processor 210.

The automatic interpretation server 200 includes a speech detecting unit 240, a speech energy calculating unit 250, a speaker determining unit 260, a noise canceling processing unit 270, and an automatic interpreting unit 280 controlled or executed by the at least one processor 210.

The speech detecting unit 240 detects a speech section of a speech signal received from each user terminal according to execution of a speech detection algorithm. The detecting of the speech section includes a process of detecting a start point and a process of detecting an end point.

Depending on the design, the speech detecting unit 240 may be installed in the user terminal. Here, the server 200 receives a speech signal corresponding to the speech section.

Alternatively, a logic for detecting the start point is installed in the user terminal, and a logic for detecting the end point may be installed in the server 200. Here, the server 200 receives a speech signal in which the start point is marked.

The speech energy calculating unit 250 calculates a plurality of speech energies from a plurality of speech signals corresponding to the detected speech section under the control of the at least one processor 210.

The speaker determining unit 260 compares the plurality of calculated speech energies to determine a speaker's speech signal from among the plurality of speech signals under the control of the at least one processor 210.

The noise canceling processing unit 270 cancels noise from the main speech signal under the control of the at least one processor 210.

The automatic interpreting unit 280 performs automatic interpretation on the determined main speech signal and transmits an acquired automatic interpretation result to the plurality of terminal devices through the communication unit 230 under the control of the at least one processor 210.

In an embodiment, regarding the first user terminal 120, the second user terminal 310, and the server 200, in order to establish a communication connection for automatic interpretation, the first user terminal 120 and the second user terminal 310 may be paired according to a short-range wireless communication protocol and subsequently exchange first language information indicating the language of the first user and second language information indicating the language of the second user.

In an embodiment, the first user terminal 120 checks the second language information transmitted from the second user terminal 310 to determine whether automatic interpretation is possible. If it is determined that automatic interpretation is not possible, the first user terminal 120 may output a connection failure message through a display screen.

In an embodiment, the speech energy calculating unit 250 may calculate a plurality of speech energies by calculating a power spectrum density corresponding to a speech section detected from each speech signal.

In an embodiment, the speaker determining unit 260 may determine a speech signal having the largest speech energy among the plurality of speech signals as the speaker's speech signal.

In an embodiment, the noise canceling processing unit 270 may cancel noise from the speech signal of the speaker using a technique of processing signals of two or more channels.

In an embodiment, the noise canceling processing unit 270 may selectively operate according to an operation control command from the user terminal 120 and/or 310.

In an embodiment, the automatic interpreting unit 280 includes a speech recognizer 282 converting a speech signal of the speaker into first text data of the first language according to a speech recognition algorithm, an automatic translator 284 converting the first text data into second text data of the second language according to an automatic translation algorithm, and a speech synthesizing unit 286 converting the first text data into a synthesized speech of the first language and converting the second text data into a synthesized speech of the second language according to a speech synthesis algorithm.

The automatic interpreting unit 280 may transmit the automatic interpretation result including the first text data, the second text data, the synthesized speech of the first language, and the synthesized speech of the second language to the plurality of terminal devices through the communication unit 230.

In an embodiment, the speech recognizer 262 may be an end-to-end speech recognizer capable of performing language identification.

In an embodiment, the speech recognizer 282, the automatic translator 284, and the speech synthesizer 286 may be integrated into one model. Here, one model may be an artificial neural network model trained in advance for machine learning.

The scope of protection of the present invention is not limited to the embodiments explicitly described above and may be variously modified. For example, in the present disclosure, it is described that the process of calculating voice energy, the process of determining a speaker (determining a main voice signal), the process of canceling noise, and the process of automatic interpretation are performed by the automatic interpretation server 200, but are not limited thereto. Alternatively, at least one of the processing steps may be performed in a user terminal according to design in consideration of hardware resources of the user terminal. In addition, it should be appreciated that the scope of protection of the present invention may not be limited due to obvious modifications or substitutions in the technical field to which the present invention pertains.

What is claimed is:

1. Automatic interpretation method performed by a server communicating with a plurality of terminal devices including a first terminal device of a first user and a second terminal device of a second user located close to each other, the automatic interpretation method comprising:
receiving a plurality of speech signals uttered by a plurality of users from a plurality of terminal devices;
acquiring a plurality of speech energies from the plurality of received speech signals;
determining a main speech signal uttered in a current utterance turn among the plurality of speech signals by comparing the plurality of acquired speech energies; and
transmitting an automatic interpretation result acquired by performing automatic interpretation on the determined main speech signal to the plurality of terminal devices,
wherein further comprising,
before receiving the plurality of voice signals,
performing pairing between the first terminal device and the second terminal device by a short-range wireless communication;
exchanging language information required for automatic interpretation by the paired first and second user terminal devices;
determining, by the first terminal device or the second terminal device, whether automatic interpretation is possible for a language used by a user of the other terminal device based on the exchanged language information; and
when the automatic interpretation is possible, transmitting, by the first terminal device or the second terminal device, a connection success message to the server to establish a communication connection between the server and the first and second terminal devices, and
wherein the determining of a main speech signal comprises:
determining a reference speech signal among the remaining speech signals; and
canceling noise of the main speech signal by using a noise signal of the main speech signal and using a ratio of a difference in power level between a estimated speech signal and the main speech signal and a difference in power level between an estimated noise signal and the noise signal.

2. The automatic interpretation method of claim 1, wherein
the acquiring of a plurality of speech energies comprises:
detecting a speech section from each speech signal; and calculating the plurality of speech energies by calculating a power spectrum density corresponding to each speech section.

3. The automatic interpretation method of claim 1, wherein
the determining of a main speech signal comprises:
determining, as the main speech signal, a speech signal having a largest speech energy among the plurality of speech signals.

4. The automatic interpretation method of claim 1, wherein
the determining of a main speech signal further comprises:
determining, as the main speech signal, a speech signal having a largest speech energy among the plurality of speech signals.

5. The automatic interpretation method of claim 4, wherein
the determining of the reference speech signal comprises determining, as the reference speech signal, a speech signal having a lowest speech energy or medium speech energy among the plurality of speech signals.

6. The automatic interpretation method of claim 5, wherein
the removing of noise of the main speech signal is selectively performed according to operation commands from the plurality of terminal devices.

7. The automatic interpretation method of claim 1, wherein
the transmitting of the automatic interpretation result to the plurality of terminal devices comprises:
acquiring a first text data of a first language from the main speech signal using a speech recognizer;
acquiring second text data automatically translated to a second language from the first text data using an automatic translator;
acquiring a synthesized speech of the first language from the first text data and acquiring a synthesized speech of a second language from the second text data, using a speech synthesizer; and
transmitting the automatic interpretation result including the first text data, the second text data, the synthesized speech of the first language, and the synthesized speech of the second language to the plurality of terminal devices.

8. The automatic interpretation method of claim 7, wherein
the acquiring of the first text data including acquiring the first text data using an end-to-end speech recognizer capable of performing language identification.

9. The automatic interpretation method of claim 7, wherein
the transmitting of the automatic translation result including the first text data, the second text data, and the synthesized speech to the plurality of terminal devices comprises:
transmitting at least one of the first text data and the synthesized speech of the first language to terminal devices of a user who uses the first language; and
transmitting at least one of the second text data and the synthesized speech of the second language to terminal devices of a user who uses the second language.

10. The automatic interpretation method of claim 1, wherein,
in the receiving of the plurality of speech signals, each speech signal corresponds to a speech section detected according to a speech detection process performed by the plurality of terminal devices.

11. An automatic interpretation server communicating with a plurality of terminal devices including a first terminal device of a first user and a second terminal device of a second user located close to each other, the automatic interpretation server being implemented as a computing device including at least one processor, a memory, and a system bus connecting the at least one processor and the memory, the automatic interpretation server comprising:
a communication unit configured to receive a plurality of speech signals from a user terminal of each terminal device under the control of the at least one processor;
a speech energy calculating unit configured to calculate a plurality of speech energies from the plurality of received speech signals under the control of the at least one processor;
a speaker determining unit configured to determine a speech signal of a speaker among the plurality of speech signals by comparing the plurality of acquired speech energies under the control of the at least one processor;
a noise canceling processing unit configured to cancel noise of the speech signal of the speaker under the control of the at least one processor; and
an automatic interpreting unit configured to transmit an automatic interpretation result acquired by performing an automatic interpretation on the noise-free speech signal of the speaker to the plurality of terminal devices through the communication unit under the control of the at least one processor,
wherein the communication unit receives a connection success message from any one of the first terminal device and the second terminal device paired by a short-range wireless communication,
wherein the communication unit, the first terminal device, and the second terminal device establish a communication connection according to the reception of the connection success message, and
wherein the noise canceling processing unit cancels noise of the speech signal of the speaker using a noise signal of the speech signal and using a ratio of a difference in power level between an estimated speech signal and the speech signal and a difference in power level between an estimated noise signal and the noise signal.

12. The automatic interpretation server of claim 11, wherein
the speech energy calculating unit calculates the plurality of speech energies by calculating a power spectrum density corresponding to a speech section detected from each speech signal.

13. The automatic interpretation server of claim 11, wherein
the speaker determining unit determines, as a speech signal of the speaker, a speech signal having a largest speech energy among the plurality of speech signals.

14. The automatic interpretation server of claim 11, wherein
the speaker determining unit selectively operates according to an operation control command from the user terminal.

15. The automatic interpretation server of claim 11, wherein
the automatic interpreting unit comprises:
a speech recognizer configured to convert the speech signal of the speaker into first text data of a first language according to a speech recognition algorithm;

an automatic translator configured to convert the first text data into second text data of a second language according to an automatic translation algorithm; and a speech synthesizing unit configured to convert the first text data into a synthesized speech of the first language and to convert the second text data into a synthesized speech of the second language, according to a speech synthesis algorithm, wherein the automatic interpretation result including the first text data, the second text data, the synthesized speech of the first language, and the synthesized speech of the second language to the plurality of terminal devices through the communication unit.

16. The automatic interpretation server of claim 15, wherein the speech recognizer is an end-to-end speech recognizer capable of performing language identification.

* * * * *